: 2,972,619
N-EPOXYALKYLIMIDES

Donald Mackey Young, New York, N.Y., assignor to Union Carbide Corporation, a corporation of New York No Drawing. Filed Jan. 10, 1957, Ser. No. 633,389

2 Claims. (Cl. 260—326.5)

This invention relates to a new and novel class of N-epoxyalkylimides and more particularly this invention is directed to N-epoxyalkylimides of polycarboxylic acids containing from three through six carbon atoms which are particularly suitable for use as plasticizers and stabilizers for halogen-containing vinyl type resins such as vinyl chloride resins.

The compounds of this invention can be represented by the general formula:

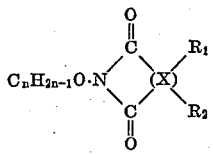

wherein the group $(C_nH_{2n-1}O)$ represents an epoxyalkyl group containing from three through twelve carbon atoms and composed of carbon, hydrogen and one oxygen atom attached to vicinal carbon atoms, X represents an aliphatic hydrocarbon chain, free from acetylenic unsaturation, containing from one to three carbon atoms and from zero to four hydrogen atoms and $R_1$ and $R_2$ represent members selected from the group consisting of hydrogen and lower alkyl groups containing from one through four carbon atoms.

The compounds are prepared by the epoxidation of N-alkenylimides. Typical N-alkenylimides include:

N-allylglutarimide
N-allylmaleimide
N-methallylsuccinimide
N-(3-butenyl)citroconimide
N-(6-dodecenyl)glutarimide
N-methallyl-2-methylmalonimide
N-(9-decenyl)dimethylmaleimide
N-(3-butenyl)alpha,alpha¹-dimethylglutarimide
N-(5-hexenyl)-4-ethyl-2,6-piperidinedione
N-allyl-3,4,5-trimethyl-2,6-piperidinedione
N-allyl-2-butylmalonimide
N-(2-butenyl)-3,5-diethyl-2,6-piperidinedione
N-(2-butenyl)n-propylmaleimide
N-(9-dodecenyl)succinimide
N-(3-hexenyl)alpha,alpha¹-diethylsuccinimide
N-methallyl-4,4-dimethyl-2,6-piperidinedione The reaction is effected by reacting an N-alkenylimide with peracetic acid or acetaldehyde monoperacetate at a temperature in the range of from 0° C. to 100° C. at atmospheric pressure. The N-alkenylimides are preferably reacted with organic solvent solutions of peracetic acid or acetaldehyde monoperacetate. Typical solvent solutions of acetaldehyde monoperacetate or peracetic acid can be those manufactured in accordance with the processes disclosed in applications, Serial Number 303,152, filed August 7, 1952, now Patent No. 2,785,185, and Serial Number 374,142, filed August 7, 1953, now abandoned.

In carrying out the process of this invention for preparing the N-(epoxyalkyl)imides employing acetaldehyde monoperacetate as the epoxidant, a typical N-(alkenyl)-imide such as, for example, N-(methallyl)maleimide is dissolved in ethylbenzene in a reaction vessel equipped with a column and a still head. The mixture is heated and the temperature maintained in the range of from 0° C. to 100° C. and preferably at about 70° C. Thereupon, acetaldehyde monoperacetate, usually, in the form of a solution in acetone is fed to the mixture of the imide in ethylbenzene at a uniform rate. Acetaldehyde, acetone and acetic acid are removed continuously at the still head. After removal of the low-boiling product, the product can be accepted as a residue or refined by further treatment such as by distillation.

When peracetic acid is employed as the epoxidizing agent, a typical imide such as N-(methallyl)maleimide is charged to a reaction vessel equipped with a condenser and a dropping funnel. A solution of peracetic acid in a suitable solvent is then added dropwise to the imide while the temperature is maintained in a range of from 0° C. to 100° C. and preferably at about 40° C. After the addition of the peracetic acid solution is complete, the reaction is continued for an additional period of time until an analysis for peracetic acid indicates that substantially the theoretical amount of peracetic acid has been consumed. Thereupon, the reaction mixture is removed from the reaction vessel and fed dropwise to a still kettle containing ethylbenzene as a pot-boiler under reflux and the low-boiling products removed. The N-(2,3-epoxy-2-methylpropyl)maleimide can then be accepted as a residue product if desired. The epoxyalkylimide can then be employed directly or subjected to further refinement by conventional means.

In the procedures described above N-(epoxyalkyl)-imides are readily prepared and include N-(epoxyalkyl)-imides such as:

N-(2,3-epoxypropyl)glutarimide
N-(2,3-epoxypropyl)maleimide
N-(2,3-epoxy-2-methylpropyl)succinimide
N-(3,4-epoxybutyl)citroconimide
N-(6,7-epoxydodecyl)glutarimide
N-(2,3-epoxy-2-methyl)malonimide
N-(9,10-epoxydecyl)dimethylmaleimide
N-(3,4-epoxybutyl)alpha,alpha¹-dimethylglutarimide
N-(5,6-epoxyhexyl)-4-ethyl-2,6-piperidinedione
N-(2,3-epoxypropyl)-3,4,5-trimethyl-2,6-piperidinedione
N-(2,3-epoxypropyl)-2-butylmalonimide
N-(2,3-epoxybutyl)-3,5-diethyl-2,6-piperidinedione
N-(2,3-epoxybutyl)n-propylmaleimide
N-(9,10-epoxydodecyl)succinimide
N-(3,4-epoxyhexyl)alpha,alpha¹-diethylsuccinimide
N - (2,3 - epoxy - 2 - methylpropyl) - 4,4 - dimethyl - 2,6-piperidinedione The analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1N aqueous sodium thiosulfate solution to a colorless endpoint. From the titration data thus obtained, a determination of epoxidant content can be made.

In order to determine the acetic acid content of the reaction mixtures in the examples, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate, may be calculated from the previous sodium thiosulfate titration determination of epoxidizing agent content on the basis of two moles of acetic acid being formed from each mole of peracetic acid or acetaldehyde monoperacetate.

When the imide is the imide of an olefinically unsaturated dibasic acid such as maleic acid, the corresponding N-(epoxyalkyl)imides serve as another useful subclass of the compounds of the invention since they are epoxy vinyl monomers and it is one of the purposes of this invention to provide bifunctional types of N-(epoxyalkyl)imides which are capable of polymerization by different mechanisms. For example, N-(epoxypropyl)-maleimide contains two dissimilar polymerizable groups, namely an alpha-epoxy groups,

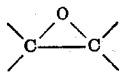

and an olefinic group, (>C=C<). As may be observed, the imide can be subjected to polymerization conditions whereby polymerization occurs through the olefinic group to the substantial exclusion of epoxide group. This type of polymerization is often referred to in the art as vinyl polymerization and usually produces a substantially linear polymer. Polymerization conditions can then be changed to the conditions favoring coupling or crosslinking through the epoxide group to produce a hard, infusible, insoluble resin having many desirable properties. This dissimilarity of the polymer-forming groups enables control over polymer formation so as to produce polymers having a diversity of useful properties not heretofore available.

The following examples are included merely as illustrative of the practice of the invention and not to be considered as limitative.

EXAMPLE 1

*Preparation of N-methallylmaleimide*

Maleic anhydride (147 grams) was dissolved in 375 cc. of benzene and heated under reflux while 118 grams of methallylamine was added dropwise over a period of about 20 minutes. N-methallylmaleamic acid crystallized from the solution on cooling and was removed by filtration. The yield of crude product was 247 grams.

The crude N-methallylmaleamic acid was divided into two portions and cyclized on an unpacked goose-neck still using an oil bath heater and provided 69 grams of N-methallylmaleimide and 163 grams of residue. The product distilled at 75° C. to 80° C. at a pressure of 5 mm. of mercury absolute, and contained three percent maleic anhydride. A further distillation of the crude maleimide provided 52 grams of purified product having a refractive index (N 30/D) of 1.4962.

EXAMPLE 2

*Preparation of N-(2,3-epoxy-2-methylpropyl)maleimide*

N-Methallylmaleimide (7.55 grams) and 17.8 grams of a 25.6 percent solution of peracetic acid in acetone were mixed together and allowed to stand at room temperature for a period of 48 hours. Titration for peracetic acid indicated that 63 percent of the peracetic acid charged to the reaction had been consumed. The product was thereupon mixed with 150 grams of ethylbenzene and distilled on a goose-neck still at a low temperature and pressure (20 mm. of Hg absolute) to remove the peracetic acid in ethylbenzene as a constant boiling mixture. The residual product was then distilled at a temperature in the range of from 75° C. to 85° C. at 1 mm. Hg absolute and provided 5 g. of distillate. This distillate was combined with the distillate of a second experiment carried out under similar conditions with the same reactants and provided N-(2,3-epoxy-2-methyl-propyl)maleimide having a boiling point of approximately 98° C. at 1 mm. of Hg absolute, a refractive index (N 30/D) of 1.4970 and having a nitrogen content (%N) of 8.17 (theoretical=8.38).

The N-(2,3-epoxy-2-methylpropyl)maleimide yielded polymer readily on treatment with catalytic amounts of dibenzoyl peroxide at steam bath temperature as well as at room temperature on treatment with BF$_3$–Et$_2$O complex. When dibenzoyl peroxide was added to the soluble BF$_3$–Et$_2$O catalyzed polymer it polymerized vigorously to an insoluble polymer of the "pop-corn" type. When dibenzoyl peroxide was used alone as catalyst, an insoluble polymer was obtained in solvent as well as non-solvent polymerizations.

I claim:

1. An N-epoxyalkylimide of the formula:

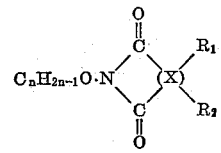

wherein the group (C$_n$H$_{2n-1}$O) represents an epoxyalkyl group containing from 3 to 12 carbon atoms and composed of carbon, hydrogen and one oxirane oxygen atom which is bonded to adjacent carbon atoms, the resulting oxirane group being one carbon atom removed from the imido nitrogen atom; wherein X represents a divalent olefinic hydrocarbon chain which contains 2 to 3 carbon atoms and from 2 to 4 hydrogen atoms; and wherein each R$_1$ and R$_2$, individually, represents members selected from the group consisting of hydrogen and a lower alkyl group which contains from one through four carbon atoms.

2. N-(2,3-epoxy-2-methylpropyl)maleimide.

References Cited in the file of this patent

UNITED STATES PATENTS

| | | |
|---|---|---|
| 2,205,558 | Flett | June 25, 1940 |
| 2,652,403 | Buc | Sept. 15, 1953 |
| 2,662,898 | Ross et al. | Dec. 15, 1953 |
| 2,676,179 | Prill | Apr. 20, 1954 |
| 2,730,531 | Payne et al. | Jan. 10, 1956 |

OTHER REFERENCES

Titus et al.: Jr. Org. Chem., vol. 13 (1948), p. 43.